United States Patent [19]

Hirano et al.

[11] Patent Number: 5,293,464
[45] Date of Patent: Mar. 8, 1994

[54] BRAILLE READING DISPLAY TERMINAL DEVICE

[75] Inventors: Hiroshi Hirano, Tokyo; Yoshitaka Osaki, Osaka; Junji Yamazaki, Urayasu City, all of Japan

[73] Assignees: NEC Corporation, Tokyo; KGS Corporation, Chiba, both of Japan

[21] Appl. No.: 935,527

[22] Filed: Aug. 25, 1992

[30] Foreign Application Priority Data

Aug. 26, 1991 [JP] Japan .................................. 3-213672

[51] Int. Cl.$^5$ ............................................. G06F 15/00
[52] U.S. Cl. .................................. 395/101; 340/425.19
[58] Field of Search ............... 395/155, 161, 101, 106, 395/114; 381/51, 52; 364/710.12, 710.01; 340/825.19; 346/154

[56] References Cited

U.S. PATENT DOCUMENTS

| | | | |
|---|---|---|---|
| 4,694,494 | 9/1987 | Woulfson | 381/51 |
| 4,875,185 | 10/1989 | Burnschein | 364/710.12 |

FOREIGN PATENT DOCUMENTS

| | | |
|---|---|---|
| 2600438 | 12/1987 | France . |
| 2612312 | 7/1988 | France . |
| 2652927 | 4/1991 | France . |
| 2652934 | 4/1991 | France . |
| 2656123 | 6/1991 | France . |
| 2141274A | 12/1984 | United Kingdom . |

OTHER PUBLICATIONS

Article entitled "Braille Display Terminal for Personal Computers" by N. Sriskanthan, et al, published in IEEE Transactions on Consumer Electronics, vol. 36, No. 2, May, 1990, New York, pp. 121-128.

Article entitled "The Architecture of an Inexpensive And Portable Talking-Tactile Terminal to Aid the Visually Handicapped", by A. I. Karshmer, et al, published in Computer Standards & Interfaces, vol. 6, No. 2, 1987, Amsterdam, pp. 207-220.

Article entitled "An Intelligent Braille Display Device", by Clifford P. Grossner, et al, published in IEEE Micro, vol. 6, No. 3, New York, Jun. 1986, pp. 43-51.

*Primary Examiner*—Arthur G. Evans
*Attorney, Agent, or Firm*—Frishauf, Holtz, Goodman & Woodward

[57] ABSTRACT

The present invention relates to a Braille reading display terminal device in which a non-intelligence-type Braille reading input/output unit is connected to a host computer through an expansion bus, an expansion bus interface is interposed between the input/output sections of the Braille reading input/output unit and the expansion bus, and unit input/output elements of the input/output sections sections are accessed or controlled through the expansion bus based on software in the host computer.

6 Claims, 1 Drawing Sheet

BRAILLE READING DISPLAY TERMINAL DEVICE

BACKGROUND OF THE INVENTION

1. Field of the Invention

The present invention relates to a Braille reading display terminal device which has an improved interface between the unit and its host computer.

2. Description of the Related Art

A conventional Braille reading display device is connected to a personal computer serving as a host computer and has an intelligence function of inputting Braille information, reading the information from a tactile pins display, and outputting the information as a voice in combination with a voice synthesizer.

The conventional Braille reading display device comprises a microprocessor having a ROM for storing Braille codes and a RAM for temporarily storing processing information to input/output Braille information, and a DIP SW (dual inline package switch) for selecting various Braille notations (e.g., six-dot pattern and eight-dot pattern) from the ROM.

Like generally-used peripheral terminal units of personal computers, the conventional Braille reading display device is connected to various personal computers through RS-232C or CENTRONICS, both of which are standard interfaces, with the result that information is transferred in series o in parallel between the device and the personal computers through the interface. Information processing peculiar to the Braille reading display device is executed by the microprocessor included therein.

However, the conventional braille reading display device has the following drawbacks.

(1) Since a widespread Braille notation method has not yet been established, information stored in a ROM has to be rewritten and the ROM has to be exchanged with another in accordance with various Braille notation methods. Since an exchange of ROMs is difficult for users, it is usually performed by makers. In most cases, however, it is difficult even for makers because the ROMs are widely used.

(2) It is troublesome to select one of interfaces RS-232C and CENTRONICS and set a transfer speed, various parameters, etc. using the DIP SW, in order to select a necessary one from various Braille notations stored in a ROM.

(3) Since a program of grammar (e.g., Six-Dot Japanese Braille Notation) proper to Braille notations has to be stored in a ROM, the capacity of the ROM is increased.

(4) Since there are different, methods for representing, Chinese characters by Braille notations, the Braille reading display device cannot be applied to all the methods.

(5) Since various peripheral units are required in addition to a CPU, a ROM, and a RAM, the cost of hardware is increased.

As described above, the conventional Braille display device has the drawback of increased total costs including running costs, debug costs, and the like, which puts much strain on both makers and users.

SUMMARY OF THE INVENTION

The present invention has been developed to resolve the above drawbacks and its object is to provide a braille reading display terminal device which has a large part of hardware in common with a host computer to simplify the structure and decrease the total costs.

A Braille reading display terminal device according to the present invention comprises input/output means having a plurality of unit input/output elements and a host computer connected to the input/output means to transfer information including control information between the host computer and input/output means. The Braille reading display terminal device further comprises an expansion bus for connecting the host computer and the input/output means, interface means for connecting the host computer and the unit input/output elements of the input/output means, and software of the host computer for accessing or controlling the unit input/output elements of the input/output means through the expansion bus.

Having the above structure, the Braille reading display terminal device is simple in structure of hardware for accessing or controlling the input/output means and is able to change programs without exchanging ROMs and the like.

The following results can be obtained from the Braille reading display terminal device of the present invention.

(1) Since the number of elements of the device can be reduced, the structure of hardware is simplified, the total cost is lowered, the failure rate is lowered, the device is compact and light weight, and the power necessary for operating the device is reduced.

(2) Since software for controlling the device can be changed by the host computer such as a personal computer, the ROM in the device need not be exchanged to another. The Braille reading display terminal device can be applied to various types of Braille notations and multilanguage.

(3) Since the speed required for information processing of the device is much lower than that for processing of external memory devices, image and communication processing, etc., a CPU chip of a standard MS DOS personal computer can execute information processing in idle time, and the capability of the CPU chip can be heightened with efficiency.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWING

The accompanying drawing, which is incorporated in and constitutes a part of the specification, illustrates a presently preferred embodiment of the invention and, together with the general description given above and the detailed description of the preferred embodiment given below, serves to explain the principles of the invention.

DETAILED DESCRIPTION OF THE PREFERRED EMBODIMENTS

Figure 1:
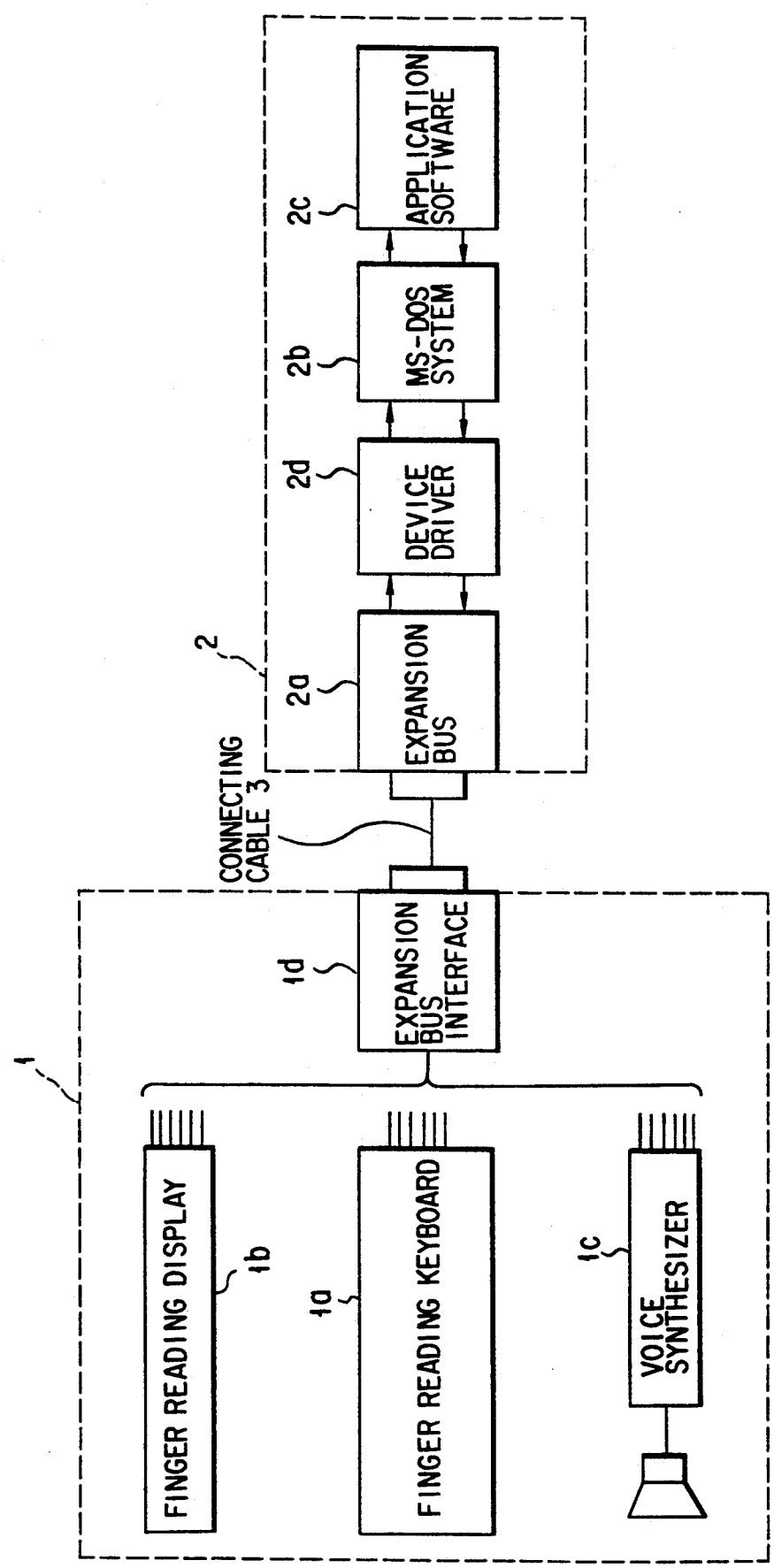
FIG. 1 is a block diagram of the structures of hardware of a Braille reading input/output unit and software of a personal computer according to an embodiment of the present invention.

An embodiment of the present invention will now be described, with reference to the accompanying drawing. FIG. 1 is a block diagram of the structures of hardware and software according to the embodiment of the present invention.

In FIG. 1, a Braille reading input/output unit 1 includes a Braille keyboard 1a serving as input means, and a tactile reading display 1b and a voice synthesizer 1c both serving as output means. The Braille keyboard 1a, tactile reading display 1b, and voice synthesizer 1c are connected to an expansion bus 2a of a personal computer 2 serving as a host computer through a expansion bus interface 1d by means of a connecting cable 3.

The Braille keyboard 1a is intended to convert characters, symbols, and the like into Braille codes and includes a plurality of unit keys for outputting a predetermined key code in accordance with six dot or eight dot codes. The tactile reading display 1b is formed of a plurality of Braille cells of six dot or eight dot codes of piezoelectric elements. The Braille codes are displayed by projected tactile pins formed at free ends of the piezoelectric elements, which can be bent. The piezoelectric elements thus form device output elements of the tactile reading display 1b. The voice synthesizer 1c generates a predetermined synthesized voice based on information supplied from the expansion bus 2a.

An information line of the expansion bus 2a includes eight data lines and several control lines to transmit parallel 8-bit data line information and control information in series from the personal computer 2 to the Braille reading input/output unit 1. The expansion bus interface 1d distributes the data line information to the Braille keyboard 1a, the tactile reading display 1b, and the voice synthesizer 1c, on the basis of the control information.

The personal computer 2 stores information necessary for controlling the Braille reading input/output unit 1 in a floppy disk (not shown). The Braille reading input/output unit is controlled by managing all of the Braille keyboard 1a, the tactile reading display 1b, and the voice synthesizer 1c, based on the information stored in the floppy disk.

For example, an operation for discriminating input Braille codes by key data transmitted from the Braille keyboard 1a, a code system and a grammar of Braille notations (six dot and eight dot patterns) for controlling the piezoelectric elements of the Braille cells of the tactile reading display 1b, a method of converting Chinese characters, foreign languages, etc. into Braille codes, and the like are managed, but the Braille reading input/output unit 1 has nothing to do with this management.

Software for controlling the finger-reading input/output unit 1 includes an MS-DOS system 2b of MICROSOFT, application software 2c on sale for a normal operation, and a device driver 2d for controlling the Braille reading input/output unit 1. The device driver 2d is added to an SO (operating system) or is a form of software operating as one process of the SO. The software for controlling the unit 1 is stored in the floppy disk and supplied therefrom. The Braille reading input/output unit 1 is controlled by means of the software stored in a memory. The software is a form of a device driver, and the device driver 2d controls input/output of the Braille keyboard 1a, the tactile reading display 1b, and the voice synthesizer 1c of the Braille reading input/output unit 1 by a fixed-cycle interrupt.

According to the above embodiment, all the information on the input/output control of the Braille reading input/output unit 1 is managed by the personal computer, and the unit 1 has no intelligence functions.

The present invention is not limited to the above embodiment. Various changes and modifications can be made without departing from the scope and spirit of the subject matter of this invention.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A Braille reading display terminal device comprising:
   input/output means, including a Braille reading keyboard, a Braille reading display and a voice synthesizer, for inputting and outputting data, said input/output means having no intelligence functions therein;
   an expansion bus having an interface function and no intelligence function; and
   a host computer connected to said input/output means through said expansion bus; and
   said host computer including software controlled means for exclusively controlling transferring of information including control information between said host computer and said input/output means, and wherein said host computer access and controls at least one of said Braille reading keyboard, said Braille reading display and said voice synthesizer of said input/output means through said expansion bus without requiring intelligence functions in said input/output means or in said expansion bus, and wherein said input/output means and said expansion bus do not control said transferring of information between said host computer and said input/output means.

2. The Braille reading display terminal device of claim 1, wherein said Braille reading keyboard comprises a finger reading keyboard.

3. The Braille reading display terminal device of claim 2, wherein said Braille reading display comprises a tactile finger reading display.

4. The Braille reading display terminal device of claim 1, wherein said Braille reading display comprises a tactile finger reading display.

5. The Braille reading display terminal device of claim 4, wherein said tactile finger reading display comprise a tactile pin display having projected tactile pins arranged to be touched by a finger of a user.

6. The Braille reading display device of claim 1, wherein said expansion bus comprises:
   an expansion bus interface in said input/output means for distributing data to and from the Braille reading keyboard, the Braille reading display and the voice synthesizer, on the basis of control information received from said host computer;
   a multi-line expansion bus in said host computer; and
   connecting cable means coupled between said expansion bus interface of said input/output means and said multi-line expansion bus of said host computer for transmitting information signals therebetween.

* * * * *